US007680563B2

(12) United States Patent
Kofuji et al.

(10) Patent No.: US 7,680,563 B2
(45) Date of Patent: Mar. 16, 2010

(54) PRESSURE CONTROL DEVICE FOR LOW PRESSURE PROCESSING CHAMBER

(75) Inventors: Naoyuki Kofuji, Tama (JP); Hiroshi Akiyama, Kudamatsu (JP); Masahiro Nagatani, Kudamatsu (JP)

(73) Assignee: Hitachi High-Technologies Corporation, Tokyo (JP)

( * ) Notice: Subject to any disclaimer, the term of this patent is extended or adjusted under 35 U.S.C. 154(b) by 192 days.

(21) Appl. No.: 11/767,547

(22) Filed: Jun. 25, 2007

(65) Prior Publication Data
US 2008/0183340 A1 Jul. 31, 2008

(30) Foreign Application Priority Data
Jan. 31, 2007 (JP) ............................. 2007-021692

(51) Int. Cl.
*G05D 16/00* (2006.01)
*G06F 19/00* (2006.01)
(52) U.S. Cl. ...................... 700/301; 700/42; 700/121; 137/14
(58) Field of Classification Search ................ 700/301, 700/121, 37, 41, 42; 137/14, 114, 487.5, 137/489.5
See application file for complete search history.

(56) References Cited

U.S. PATENT DOCUMENTS 6,142,163 A * 11/2000 McMillin et al. .............. 137/14
6,942,892 B1 * 9/2005 Ishibashi .................... 427/237
2005/0167398 A1 * 8/2005 Kitazawa ...................... 216/59
2005/0269031 A1 * 12/2005 Tyler et al. ............. 156/345.48
2008/0050538 A1 * 2/2008 Hirata ......................... 427/585

FOREIGN PATENT DOCUMENTS

JP 10-011152 1/1998

* cited by examiner

*Primary Examiner*—Albert DeCady
*Assistant Examiner*—Steven R Garland
(74) *Attorney, Agent, or Firm*—Antonelli, Terry, Stout & Kraus, LLP.

(57) ABSTRACT

A control method which quickly adjusts a plasma processing apparatus to a desired pressure regardless of gas type, gas flow rate or target pressure simply by optimizing constants. The plasma processing apparatus includes: gas supply means which supplies processing gas to a low pressure processing chamber; plasma generating means which supplies electromagnetic energy to the processing gas in the low pressure processing chamber and generates plasma; exhaust means which exhausts gas in the low pressure processing chamber; gas pressure measuring means which measures gas pressure in the low pressure processing chamber; exhaust speed adjusting means which adjusts exhaust speed of gas to be exhausted by the exhaust means; and an arithmetic and control unit calculates an exhaust speed to make the gas pressure measured by the pressure measuring means equal to a target value, and controls the exhaust speed adjusting means according to the calculation result.

6 Claims, 18 Drawing Sheets

|   | n | |
|---|---|---|
|   | 1 | 2 |
| a | 1.0 | $5.08 \times 10^{-3}$ |
| b | 0 | $8.48 \times 10^{-3}$ |
| c | 0 | $5.09 \times 10^{-3}$ |
| $G_d$ | 0 | |

|   | n | |
|---|---|---|
|   | 1 | 2 |
| a | 1.0 | $5.08 \times 10^{-3}$ |
| b | 0 | $1.32 \times 10^{-1}$ |
| c | 0 | $7.89 \times 10^{-2}$ |
| $G_d$ | 0 | |

|   | n | |
|---|---|---|
|   | 1 | 2 |
| a | 1.0 | $5.08 \times 10^{-3}$ |
| b | $1.69 \times 10^{-2}$ | 0 |
| c | $1.02 \times 10^{-2}$ | 0 |
| $G_d$ | 0 | |

|   | n | |
|---|---|---|
|   | 1 | 2 |
| a | 1.0 | 0 |
| b | 0 | 5.09 x 10$^{-3}$ |
| c | 0 | 5.09 x 10$^{-3}$ |
| $G_d$ | 0 | |

|   | n | |
|---|---|---|
|   | 1 | 2 |
| a | 1.0 | $5.08 \times 10^{-3}$ |
| b | 0 | $2.08 \times 10^{-2}$ |
| c | 0 | $1.36 \times 10^{-2}$ |
| $G_d$ | 0 | |

| | n | | |
|---|---|---|---|
| | 1 | 2 | 3 |
| a | 1.0 | $5.08 \times 10^{-3}$ | — |
| b | 0 | $1.48 \times 10^{-2}$ | $9.86 \times 10^{-3}$ |
| c | 0 | $8.13 \times 10^{-3}$ | $5.42 \times 10^{-3}$ |
| $G_d$ | 0 | | |

FIG. 31
| step | GAS | TIME (s) | FLOW RATE (sccm) | PRESSURE (Pa) | MICROWAVE POWER |
|---|---|---|---|---|---|
| 1 | A/B/I | 10 | 40/3/110 | 0.4 | 400W |
| 2 | A/C/B/R | 5 | 15/45/7/25 | 0.4 | 400W |
| 3 | C/B/R | 15 | 70/4/70 | 2.0 | 400W |
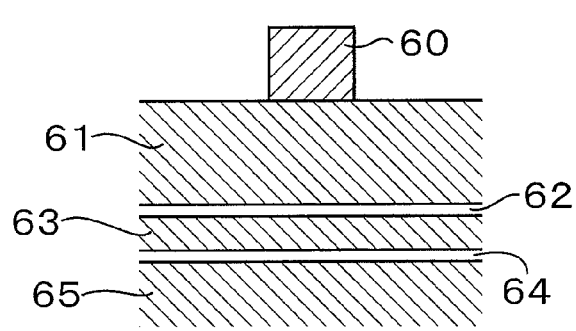
FIG. 32A
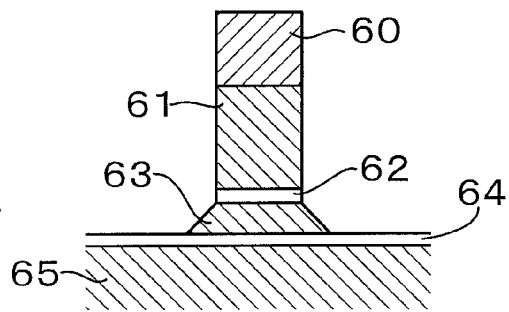
FIG. 32B
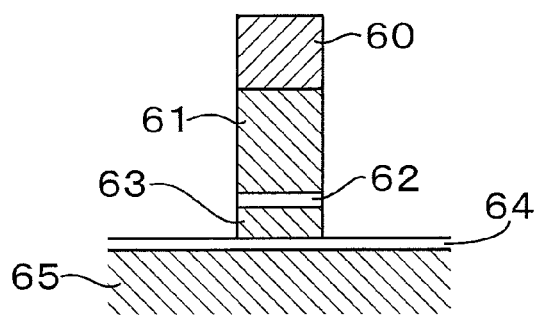
FIG. 32C

PRESSURE CONTROL DEVICE FOR LOW PRESSURE PROCESSING CHAMBER

BACKGROUND OF THE INVENTION (1) Field of the Invention

The present invention relates to pressure control techniques which control the pressure in a low pressure processing chamber such as a plasma processing chamber and more particularly to a pressure control technique which enables high speed control regardless of plasma dissociation or change in the effective flow rate.

(2) Description of the Related Art

FIG. 2 illustrates a device which controls the pressure in a low pressure processing chamber. As shown in FIG. 2, a throttle valve 3 is located between a low pressure processing chamber 1 and an exhaust device 2. In this control device, the reading of a pressure gauge 4 connected with the low pressure processing chamber 1 through an arithmetic and control unit 13 is fed back and reflected in the opening degree of the throttle valve 3 so that the pressure in the low pressure processing chamber is automatically controlled (see Japanese Patent Application Laid-Open Publication No. H10-11152).

There are various known methods of feeding back the reading of a pressure gauge for the valve opening degree and the most commonly used method is PID control. Usually in a typical PID control method, valve opening operation amount $\Delta VV$ is calculated for each control cycle in accordance with a PID control calculation formula (Formula 1 below) to control the opening degree of the valve.

[Formula 1]

$$\Delta VV\ 32\ VV_{n+1} - VV_n = Gi(P_n - P_0) + G_p(P_n - P_{n-1}) + G_d(P_n - 2P_{n-1} + P_{n-2}) \quad (1)$$

Here, $\Delta VV$: Valve opening operation amount (%)
$VVn+1$: Next valve opening operation degree (%)
$VVn$: Current valve opening degree (%)
$Pn$: Current pressure (Pa)
$Pn-1$: Previous pressure (Pa)
$Pn-2$: Pressure before previous pressure (Pa)
$P0$: Target pressure (Pa)
$Gi$: Integral gain (fixed)
$Gp$: Proportional gain (fixed)
$Gd$: Differential gain (fixed)

In the above PID control method in which the valve opening operation amount $\Delta VV$ is calculated for each control cycle to control the valve opening degree, control is stable under a condition that the gain values in the PID control calculation formula are optimal. However, it may take long time to reach a target pressure. In addition, it may take extremely long time to reach the target pressure if there is a large difference from the optimal condition in terms of gas type, gas flow rate, gas dissociation state or target pressure level.

In other words, the above control method takes long control time and requires gain optimization for each condition. Besides, hunting often occurs with a butterfly throttle valve which shows a very nonlinear relation between valve opening and exhaust speed.

SUMMARY OF THE INVENTION

The present invention has been made in view of the above problem and provides a control technique which quickly adjusts the low pressure processing chamber to a desired pressure regardless of gas type, gas flow rate or target pressure simply by optimizing constants.

In order to address the problem, the present invention provides a pressure control device for a low pressure processing chamber which has the following constitution.

The device includes: a low pressure processing chamber; gas supply means which supplies processing gas to the low pressure processing chamber; plasma generating means which supplies electromagnetic energy to the processing gas supplied to the low pressure processing chamber and generates plasma; exhaust means which exhausts gas in the low pressure processing chamber; gas pressure measuring means which measures gas pressure in the low pressure processing chamber; exhaust speed adjusting means which adjusts exhaust speed of gas to be exhausted by the exhaust means; and an arithmetic and control unit which makes control calculation to calculate an exhaust speed to make the gas pressure measured by the pressure measuring means equal to a target value, and controls the exhaust speed adjusting means according to the calculation result.

Therefore, according to the present invention, the low pressure processing chamber can be quickly adjusted to a desired pressure regardless of gas type, gas flow rate or target pressure simply by optimizing constants.

BRIEF DESCRIPTION OF THE DRAWINGS

The invention will be more particularly described with reference to the accompanying drawings, in which:

FIG. 31 is a table showing conditions for three steps according to a third embodiment;

FIG. 32A shows the structure of a sample at the first step in an etching process, FIG. 32B shows the second step in the process and FIG. 32C shows the third step in the process;

DETAILED DESCRIPTION OF THE INVENTION

Figure 1:
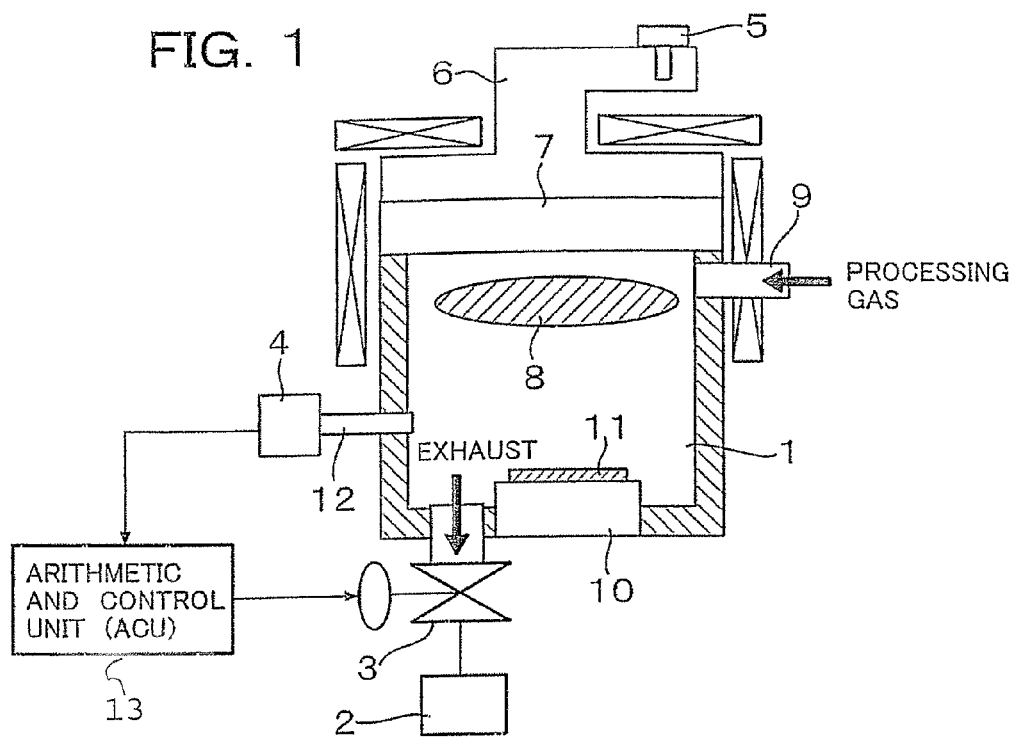
FIG. 1 illustrates an example of a microwave plasma processing apparatus which adopts a pressure control method according to the present invention.
Figure 2:
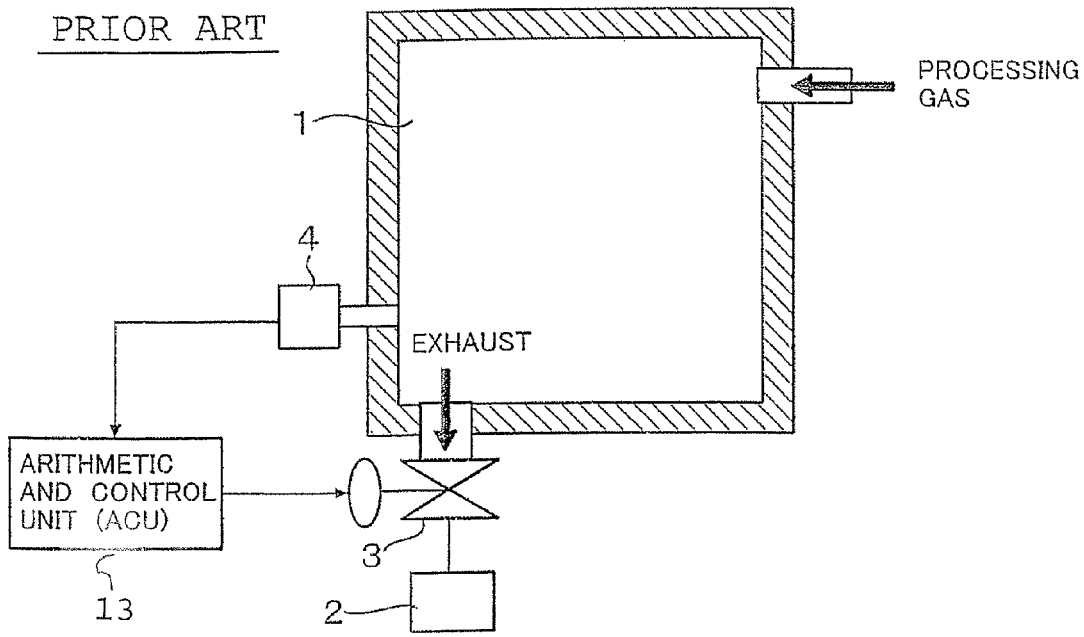
FIG. 2 illustrates a conventional device for controlling the pressure in a low pressure processing chamber.

Next, the preferred embodiments of the present invention will be described in detail referring to the accompanying drawings. First, the present inventors have developed PID control calculation formulas in order to provide a control technique which quickly adjusts the low pressure processing chamber to a desired pressure regardless of gas type, gas flow rate or target pressure. The characteristics of the control method using the formulas are as follows.

(1) Integral gain Gi is not constant but is a function which has a positive correlation with exhaust speed Sn calculated from the valve opening degree in each control cycle and also a negative correlation with target pressure value P0 and varies from one control cycle to another. In other words, when the valve opening is larger and the target pressure value is smaller, the integral gain is larger, and conversely when the valve opening is smaller and the target pressure value is larger, the integral gain is smaller.

(2) Proportional gain Gp is not constant but is a function which has a negative correlation with target pressure value P0. In other words, when the target pressure value is smaller, the proportional gain is larger, and conversely when the target pressure value is larger, the proportional gain is smaller.

(3) According to the result of calculation using the integral gain Gi and proportional gain Gp, the valve opening is not directly adjusted but the valve opening is adjusted so as to attain the calculated exhaust speed operation amount.

The correlation between exhaust speed and valve opening can be determined by measurements using standard gas in advance. Therefore, it is not necessary to make measurements for each gas type and each gas flow rate in advance.

The integral gain Gi and proportional gain Gp which satisfy the above condition can be calculated in accordance with Formulas 2 and 3:

[Formula 2]

$$G_i = \frac{a_1 + a_2 S_n}{b_1 + b_2 P_0} \quad (2)$$

[Formula 3]

$$G_p = \frac{1}{c_1 + c_2 P_0} \quad (3)$$

The opening degree of the exhaust valve, $\Delta VV$, is determined in accordance with Formulas 4 and 5 using the above integral gain Gi and proportional gain Gp and a differential gain.

[Formula 4]

$$\Delta S = S_{n+1} - S_n = G_i(P_n - P_0) + G_p(P_n - P_{n-1}) + G_d(P_n - 2P_{n-1} + P_{n-2}) \quad (4)$$

[Formula 5]

$$\Delta VV = F(S_{n+1}) - VV_n \quad (5)$$

Here, $\Delta VV$: Valve opening operation amount (%)
$\Delta S$: Exhaust speed operation amount (L/s)
$VV_{n+1}$: Next valve opening operation degree (%)
$VV_n$: Current valve opening degree (%)
$S_{n+1}$: Next exhaust speed (L/s)
$S_n$: Current exhaust speed (L/s)
$P_n$: Current pressure (Pa)
$P_{n-1}$: Previous pressure (Pa)
$P_0$: Target pressure (Pa)
Gi: Integral gain (varies from one control cycle to another)
Gp: Proportional gain (varies from one control cycle to another)
Gd: Differential gain (constant)
F(s): Function of exhaust speed and valve opening as measured using standard gas in advance
a1, b1, c1: 0 or a positive constant (fixed)
a2, b2, c2: a positive constant (fixed)

Exhaust speed operation amount $\Delta S$ was calculated in accordance with the above formulas and valve opening operation amount $\Delta VV$ was calculated based on the calculated $\Delta S$, and the valve was operated according to the calculated $\Delta VV$. The result shows that the following effect is achieved by using the above formulas.

By setting appropriate values for the constants "an", "bn", "cn" in Formulas 2 and 3, the effective flow rate is calculated from the pressure and exhaust speed in each control cycle and it is automatically fed back and reflected in gain values so that control is optimized. Therefore, quick and stable control is done regardless of gas flow rate or target pressure. Furthermore, according to the result of calculation ($\Delta S$) using control calculation formulas, the valve opening is not directly adjusted but the valve opening is adjusted so as to attain the above calculated exhaust speed operation amount ($\Delta S$). Consequently, even if the function of the opening degree of a throttle valve and exhaust speed, F(S), is very nonlinear, control can be performed stably with less hunting.

Also, optimal control can be achieved regardless of throttle valve structure by optimizing the constants "an", "bn", "cn" in Formulas 2 and 3 for a specific gas type, a specific gas flow rate and a specific target pressure and pre-calculating the function of exhaust characteristics F(S). Besides, even when the gas type, gas flow rate, gas dissociation state or target pressure changes, optimal control can be achieved.

Next, the information about optimal control which has been thus obtained will be given in detail.

First Embodiment

FIG. 1 illustrates an example of a microwave plasma processing apparatus which adopts a pressure control method according to the present invention.

In this apparatus, plasma 8 is generated by introducing a microwave generated by a magnetron 5 through a wave guide 6 and a quartz window 7 into a low pressure processing chamber 1. Processing gas introduced through a gas inlet 9 is dissociated by the plasma 8 and a sample 11 placed on a sample holder 10 is processed using radicals generated by dissociation. The low pressure processing chamber 1 has a capacity of 59 liters.

The plasma processing apparatus includes a butterfly throttle valve 3 as an exhaust speed adjusting means between the low pressure processing chamber 1 and an exhaust device 2 so that the pressure in the low pressure processing chamber is automatically controlled by feeding back the difference between the reading of a pressure gauge 4 connected with the low pressure processing chamber 1 and the target pressure to let it reflected in the opening degree of the throttle valve 3 through an arithmetic and control unit 13. The operation speed of the throttle valve 3 is 25% per second (it takes four seconds for valve operation from the fully closed state to the fully open state).

Figure 3:
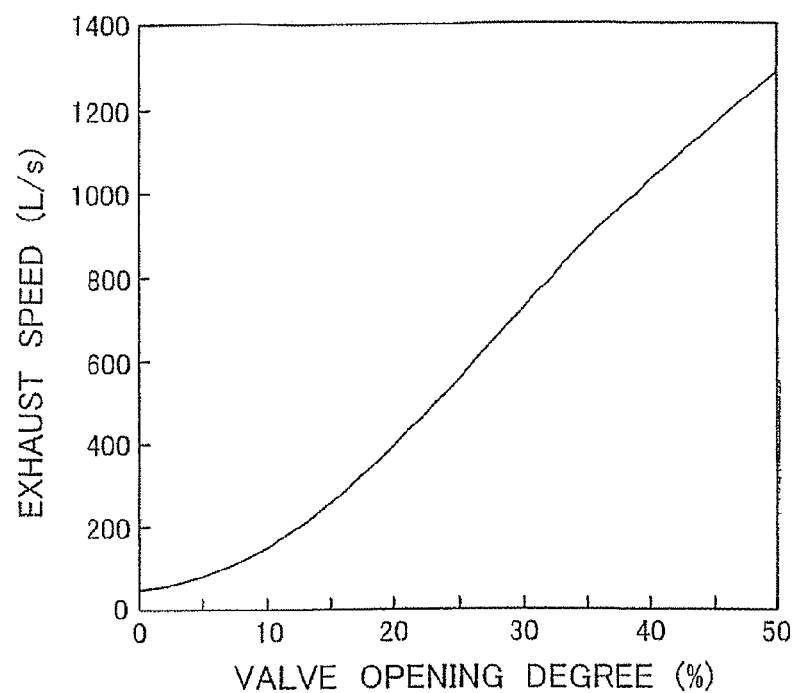
FIG. 3 is a graph showing the relation between exhaust speed and valve opening.

The relation between the opening of the valve 3 and the processing chamber pressure was measured using $O_2$ gas, as the processing gas, supplied at a flow rate of 150 sccm. FIG. 3 shows the relation between exhaust speed and valve opening as calculated from the measured processing chamber pressure. In the pressure control device according to the present invention, the result indicated in FIG. 3 is used as function F in Formula 5 above.

Figure 4:
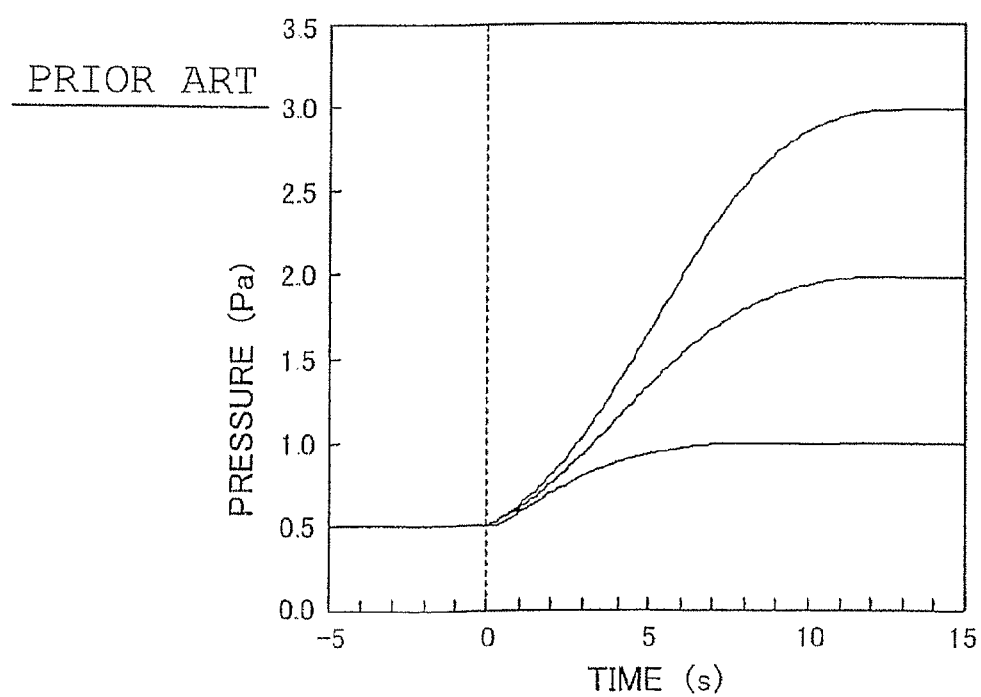
FIG. 4 is a graph showing pressure response in the conventional control method.

Next, consideration will be given to automatic pressure control in control cycles of 300 ms using the pressure control device as shown in FIG. 1. Prior to discussing the PID control method in this embodiment, an explanation is given below of the result of a test conducted on the common conventional PID control method (in the conventional method, valve opening operation amount ΔVV is calculated for each control cycle in accordance with the PID control calculation formula (Formula 1) to control the valve opening). In the test on the conventional control method, $O_2$ gas was supplied at 150 sccm as the processing gas and automatic pressure control was performed so as to reach target pressure 0.5 Pa once in the absence of plasma discharge; then at time t=0s the pressure response with higher target pressures 1.0 Pa, 2.0 Pa, and 3.0 Pa was investigated. For gain values in the PID control calculation formulas, optimized values for each condition were used. FIG. 4 shows the result of control by the conventional control method. As shown in FIG. 4, it took 7-12 seconds to reach the target pressures.

Figures 5, 6:
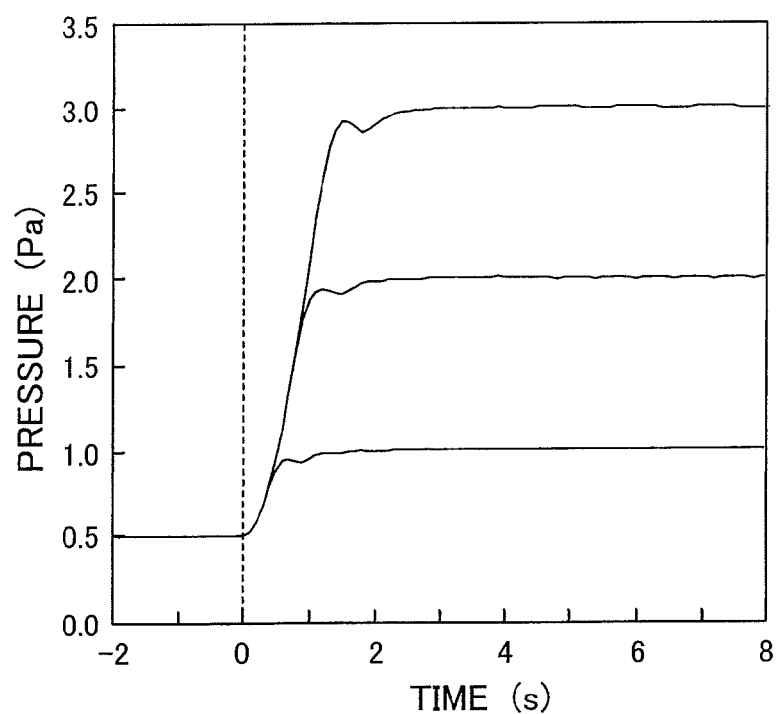
FIG. 5 is a table of constants which are used in a first embodiment.
FIG. 6 is a graph showing pressure response in the control method according to the first embodiment.

Next, the control method according to the present invention (in which PID control calculations are made in accordance with Formulas 2-5 to calculate the exhaust speed and the calculation result is fed back to the exhaust speed adjusting means) was carried out. The constants "an", "bn", "cn" used for the control calculations are shown in FIG. 5. FIG. 6 shows the result of control by this control method.

Figure 7:
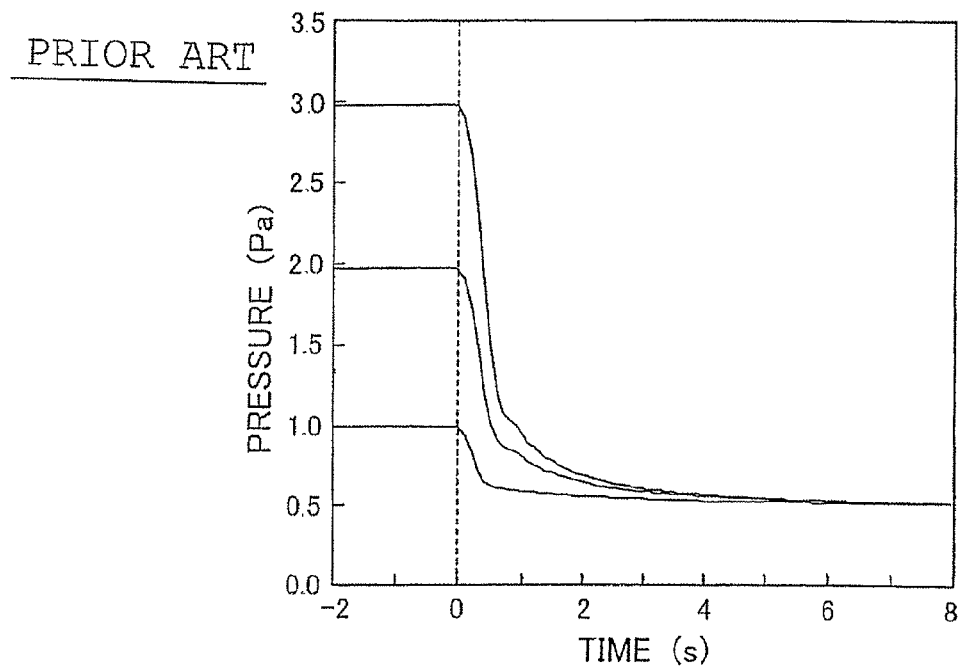
FIG. 7 is a graph showing pressure response in the conventional control method.
Figure 8:
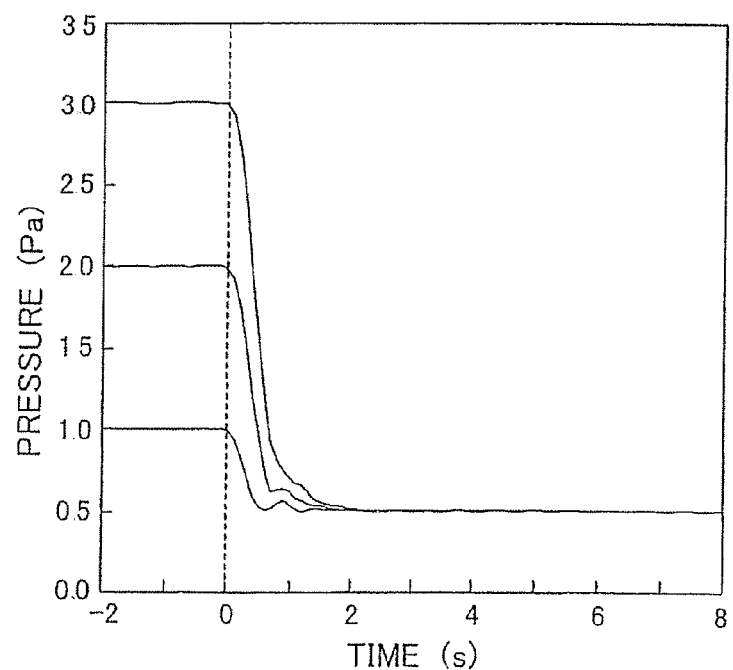
FIG. 8 is a graph showing pressure response in the control method according to the first embodiment.

As apparent from FIG. 6, the target pressures were reached in one or two seconds in the control method according to this embodiment. A test was conducted to investigate the pressure response in decreasing the target pressure from 1.0, 2.0 and 3.0 Pa to 0.5 Pa. FIGS. 7 and 8 show pressure response in the conventional control method and the control method according to this embodiment, respectively. While it takes 5-7 seconds to reach target pressure 0.5 Pa in the conventional method as shown in FIG. 7, it takes 2 seconds to reach 0.5 Pa in the control method according to this embodiment as shown in FIG. 8.

This suggests that according to this embodiment, quicker control can be done regardless of target pressure by optimizing constants "an", "bn", and "cn".

Figure 9:
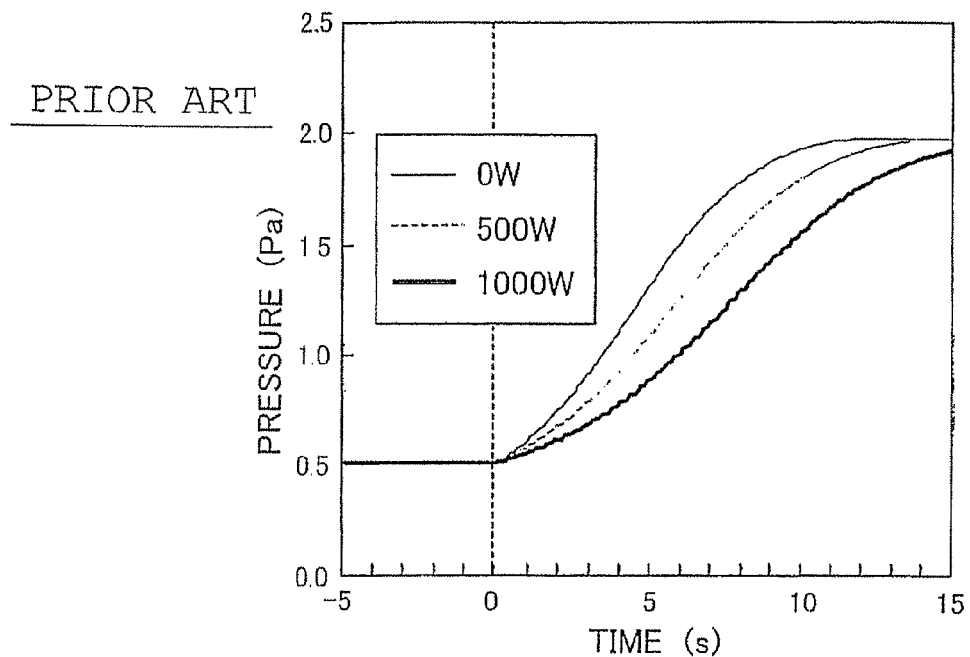
FIG. 9 is a graph showing pressure response in the conventional control method.
Figure 10:
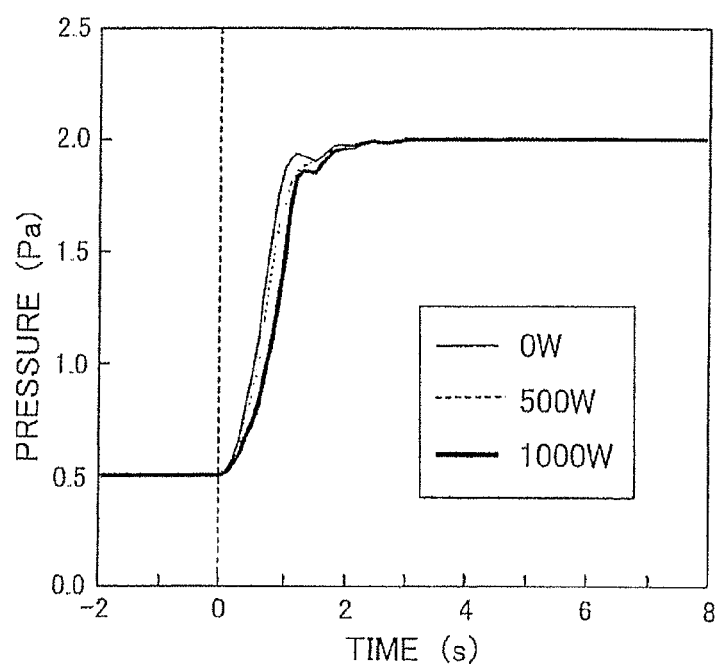
FIG. 10 is a graph showing pressure response in the control method according to the first embodiment.

Then, the target pressure was increased from 0.5 Pa to 2.0 Pa under the condition that $O_2$ gas as processing gas was supplied at a flow rate of 150 sccm and plasma discharge was generated. Tests were conducted on pressure response in the conventional control method and the control method according to this embodiment at different microwave power levels. In the conventional control method, gain values optimized under the condition of $O_2$ gas supply at a flow rate of 150 sccm in the absence of plasma discharge were used. For constants "an", "bn", and "cn" in the control method according to this embodiment, the values shown in FIG. 5 were used. FIGS. 9 and 10 respectively show the results of these tests.

As the microwave power is larger, dissociation progresses and one $O_2$ gas molecule turns into two O radicals and thus the number of moles becomes larger and the effective flow rate increases. Therefore, in the conventional control method, if gain values obtained without plasma are used, it takes longer time to reach the target pressures and with 1000 W microwave power, target pressure 2 Pa is not reached in 15 seconds, as shown in FIG. 9.

Figure 11:
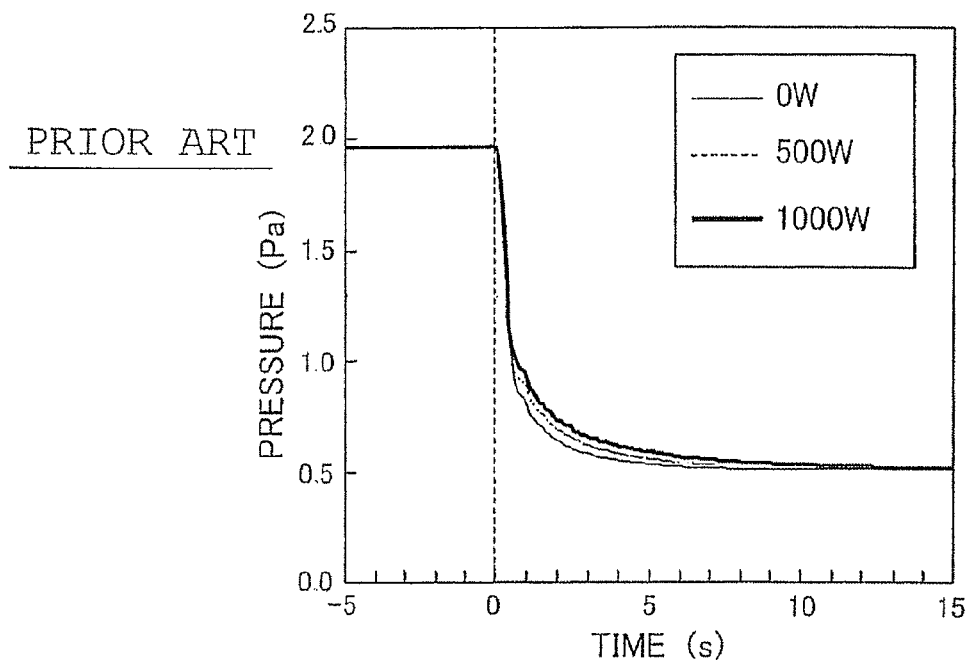
FIG. 11 is a graph showing pressure response in the conventional control method.
Figure 12:
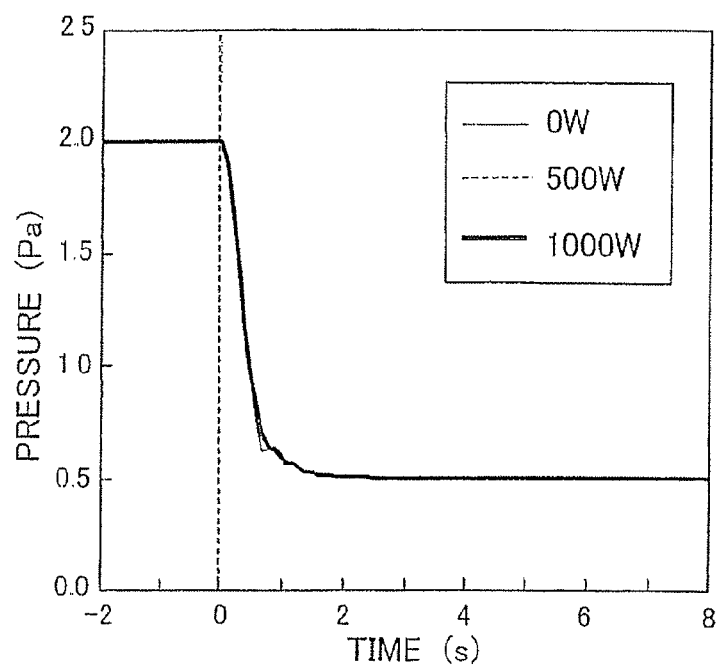
FIG. 12 is a graph showing pressure response in the control method according to the first embodiment.

On the other hand, in the control method according to this embodiment, the effective flow rate is calculated for each control cycle and automatically fed back and reflected in gain values. Consequently, pressure 2 Pa is reached in about two seconds, whether the microwave power is 0, 500 or 1000 W, as shown in FIG. 10. FIGS. 11 and 12 respectively show the results of tests which were conducted using the conventional control method and the control method according to this embodiment where the target pressure was decreased from 2.0 Pa to 0.5 Pa.

In the conventional control method, as shown in FIG. 11, when the microwave power is larger, it takes longer time to reach target pressure 0.5 Pa (up to 13 seconds or so). By contrast, in the control method according to this embodiment, pressure response is the same at any microwave power level as shown in FIG. 12 and target pressure 0.5 Pa is reached in about 2 seconds.

This demonstrates that the control method according to this embodiment permits quick control with optimized constants "an", "bn", and "cn", regardless of plasma dissociation or effective flow rate.

Figure 13:
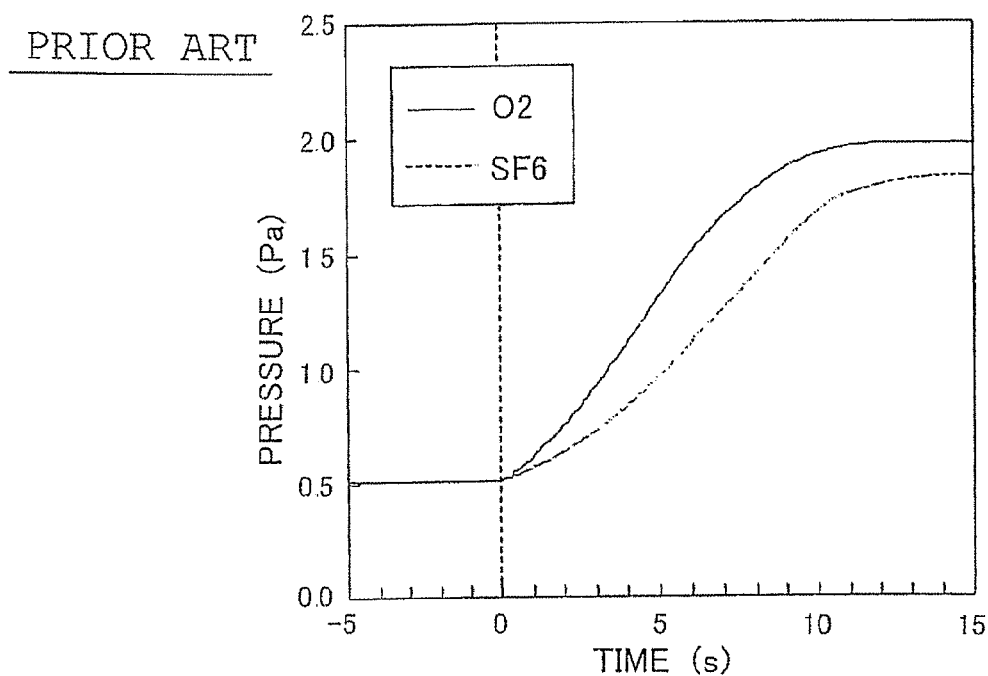
FIG. 13 is a graph showing pressure response in the conventional control method.
Figure 14:
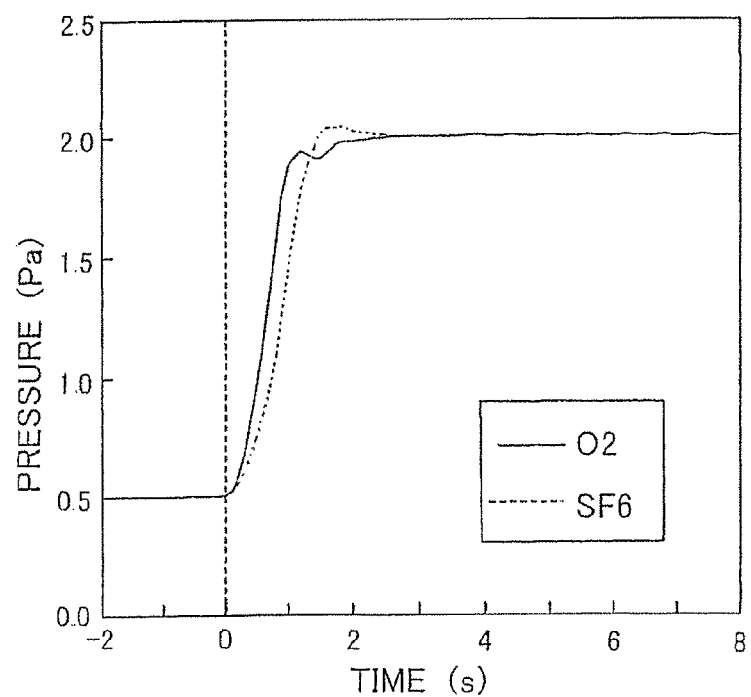
FIG. 14 is a graph showing pressure response in the control method according to the first embodiment.

Then, the target pressure was increased from 0.5 Pa to 2.0 Pa under the condition that $SF_6$ gas as processing gas was supplied at a flow rate of 150 sccm and there was no plasma discharge. Tests were conducted on pressure response in the conventional control method and the control method according to this embodiment. In the conventional control method, gain values optimized under the condition of $O_2$ gas supply at a flow rate of 150 sccm in the absence of plasma discharge were used. For constants "an", "bn", and "cn" in this embodiment, the values shown in FIG. 5 were used. FIGS. 13 and 14 respectively show the results of these tests.

Since $SF_6$ gas is harder to exhaust than $O_2$ gas, the effective exhaust speed decreases about 60 percent. Consequently $SF_6$ gas requires longer time to reach the target pressure than $O_2$ gas, and as shown in FIG. 13, target pressure 2 Pa is not reached in 15 seconds. By contrast, in the control method according to this embodiment, the difference in demonstrated characteristics between $SF_6$ gas and $O_2$ gas is small and 2 Pa is reached in about 2 seconds as shown in FIG. 14.

Figure 15:
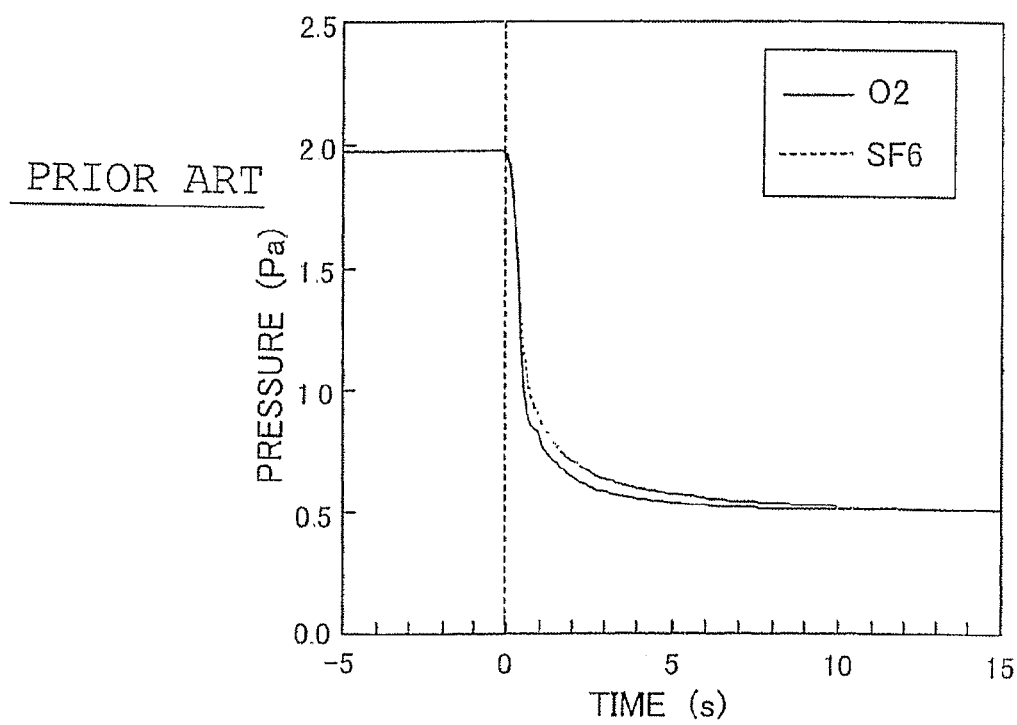
FIG. 15 is a graph showing pressure response in the conventional control method.
Figure 16:
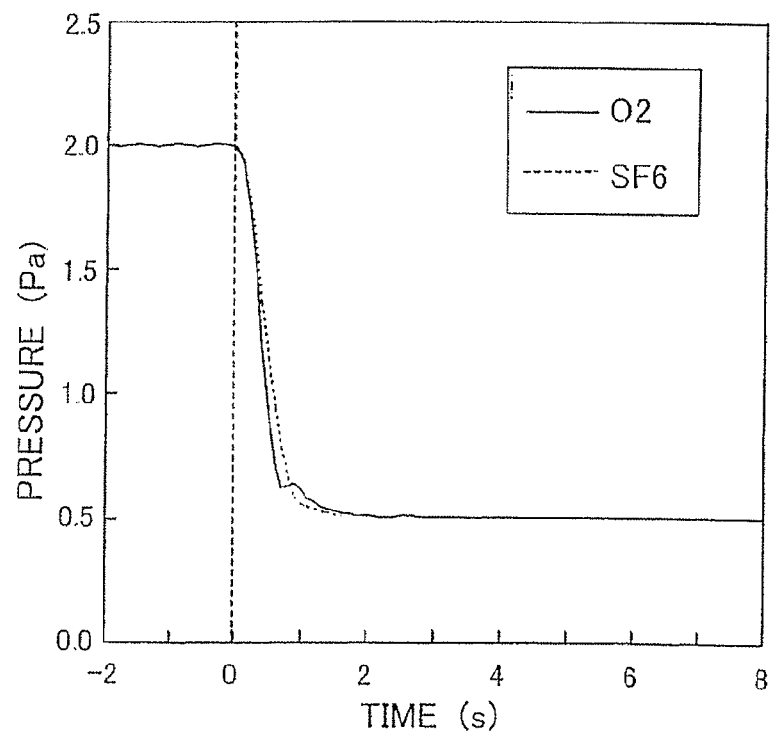
FIG. 16 is a graph showing pressure response in the control method according to the first embodiment.

FIGS. 15 and 16 respectively show the results of tests on pressure response in the conventional control method and the control method according to this embodiment where the target pressure was decreased from 2.0 Pa to 0.5 Pa. In the conventional control method, $SF_6$ gas requires longer time to reach 0.5 Pa than $O_2$ gas, and as shown in FIG. 15, it takes up to 10 seconds or so. By contrast, in the control method according to this embodiment, the difference in pressure response between the gases is smaller and 0.5 Pa is reached in about 2 seconds as shown in FIG. 16.

This demonstrates that the control method according to this embodiment permits quick control with optimized constants "an", "bn", and "cn", regardless of gas type.

As explained above, the control method according to this embodiment permits robust quick pressure control which does not depend on gas pressure, gas flow rate, gas type and gas dissociation state. In the above examples of pressure control, the flow rate was constant; however, this embodiment achieves a similar effect even in pressure control at the time of gas change which involves a large change in the flow rate or in maintaining the pressure constant when the gas flow rate is changed.

In this embodiment, integral gain Gi and proportional gain Gp are calculated in accordance with Formulas 2 and 3 respectively and the valve opening operation amount is calculated in accordance with Formulas 4 and 5. However, a similar effect can be achieved irrespective of the above formulas if the following conditions are satisfied: (a) integral gain Gi is a function which has a positive correlation with exhaust speed Sn and also has a negative correlation with current pressure Pn and target pressure value P0; (b) proportional gain Gp is a function which has a negative correlation with current pressure Pn and target pressure P0; and (c) the valve opening is adjusted so that the value obtained by the PID control calculation formulas is the exhaust speed operation amount. Although differential gain Gd is 0 in this embodiment, a similar effect can be achieved using a differential gain value other than 0 as far as the value is appropriate.

COMPARATIVE EXAMPLE 1

One feature of the first embodiment is that the valve opening is not directly adjusted according to the value obtained from the PID control calculation formulas but the valve opening is adjusted so that the value obtained by the above calculation formulas is the exhaust speed operation amount. The advantage of this feature is discussed below.

First, a pressure control test was conducted using Formulas 2 and 3 which express integral gain Gi and proportional gain Gp and using PID control calculation formula, Formula 1, which directly expresses the valve opening operation amount.

Figures 17, 18:
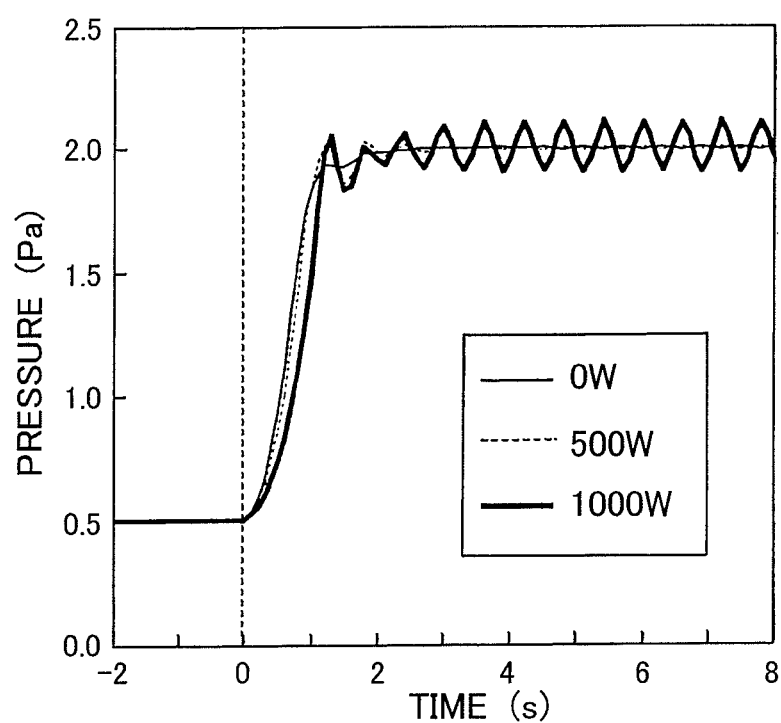
FIG. 17 is a table of constants which are used in Comparative Example 1.
FIG. 18 is a graph showing pressure response in the control method of Comparative Example 1.

In the test, $O_2$ gas as processing gas was supplied at a flow rate of 150 sccm and the target pressure was increased from 0.5 Pa to 2.0 Pa in the presence of plasma discharge. Like the first embodiment, pressure response at different microwave power levels was investigated. For constants "an", "bn", and "cn", the values optimized without plasma as shown in FIG. 17 were used. FIG. 18 shows the test result.

As shown in FIG. 18, while control is stable with smaller microwave power (0 W, 500 W), hunting occurs around 2 Pa with larger microwave power (1000 W). The inventors researched the cause for this and found that since the effective flow rate increases with larger microwave power, the valve opening in the steady 2 Pa state increased from 8.4% at 0 W microwave power to 15% at 1000 W. Referring to FIG. 3 which shows the relation between valve opening and exhaust speed, the exhaust speed changes with a change of the valve opening (1%) as follows: 15 L/s at 8.4% valve opening or so and 25 L/s at 15% or so. Hence, it is thought that hunting occurred because the exhaust speed was too high at 1000 W even with the same valve opening operation amount.

On the other hand, in the first embodiment, the value obtained from the PID control formulas using Formulas 4 and 5 is the exhaust speed operation amount. This may be the reason why control is done stably without hunting as shown in FIG. 10 even when a valve with very nonlinear exhaust characteristics is used, or when gas is dissociated.

Although the first embodiment uses the PID control calculation formula and Formulas 4 and 5 as the transform expressions from the PID control calculation formula for the valve opening operation amount, any PID control calculation formula may be used to achieve a similar effect if the valve opening can be adjusted so that the formula expresses the exhaust speed operation amount. Although the first embodiment uses a butterfly throttle valve which provides a nonlinear relation F(s) between valve opening and exhaust speed, a pendulum type throttle valve which demonstrates relatively linear exhaust characteristics may be used to achieve a similar effect.

COMPARATIVE EXAMPLE 2

Another feature of the first embodiment is that integral gain Gi and proportional gain Gp are functions which have a negative correlation with target pressure P0 in Formulas 2 and 3. The advantage of this feature is discussed below.

First, in order to eliminate the correlation of integral gain Gi and proportional gain Gp with target pressure P0, a pressure control performance test was carried out where b2 and c2 in Formulas 2 and 3 were 0.

Figures 19, 20:
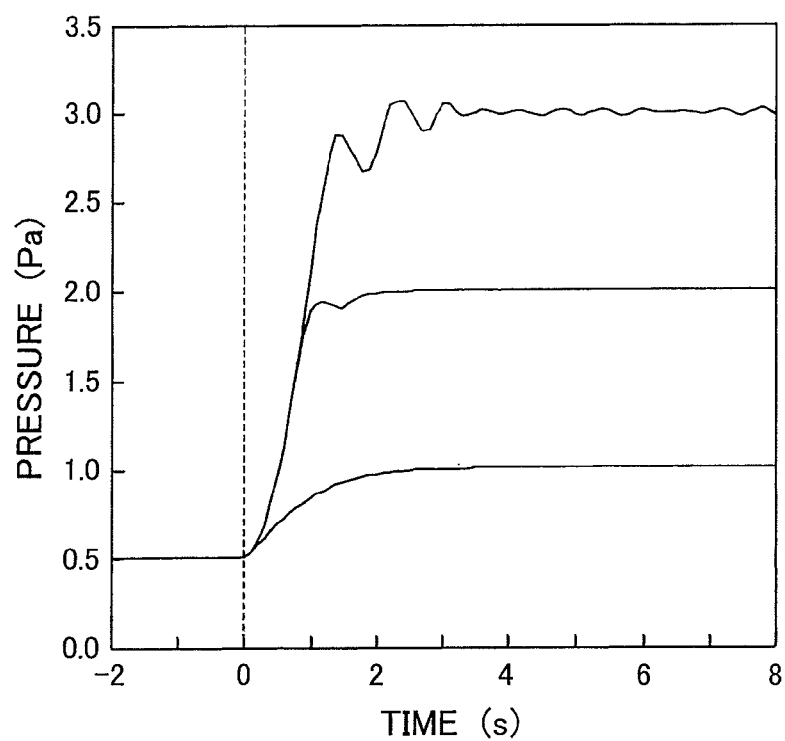
FIG. 19 is a table of constants which are used in Comparative Example 2.
FIG. 20 is a graph showing pressure response in the control method of Comparative Example 2.

In the test, $O_2$ gas as processing gas was supplied at a flow rate of 150 sccm and the target pressure was increased from 0.5 Pa to 1.0, 2.0 and 3.0 Pa in the absence of plasma discharge and pressure response was investigated. For constants other than bc and c2, namely "an", "bn", and "cn", the values optimized for target pressure increase from 0.5 pa to 2.0 Pa as shown in FIG. 19 were used. FIG. 20 shows the test result.

Under the optimized condition for 2.0 Pa target pressure, the pressure rises almost as quickly as in the case shown in FIG. 6 where b2 and c2 are not 0. On the other hand, under the non-optimized condition for 1.0 Pa target pressure, the pressure does not rise quickly, and under the non-optimized condition for 3.0 target pressure, hunting occurs in the initial phase of pressure rise.

Figures 21, 22:
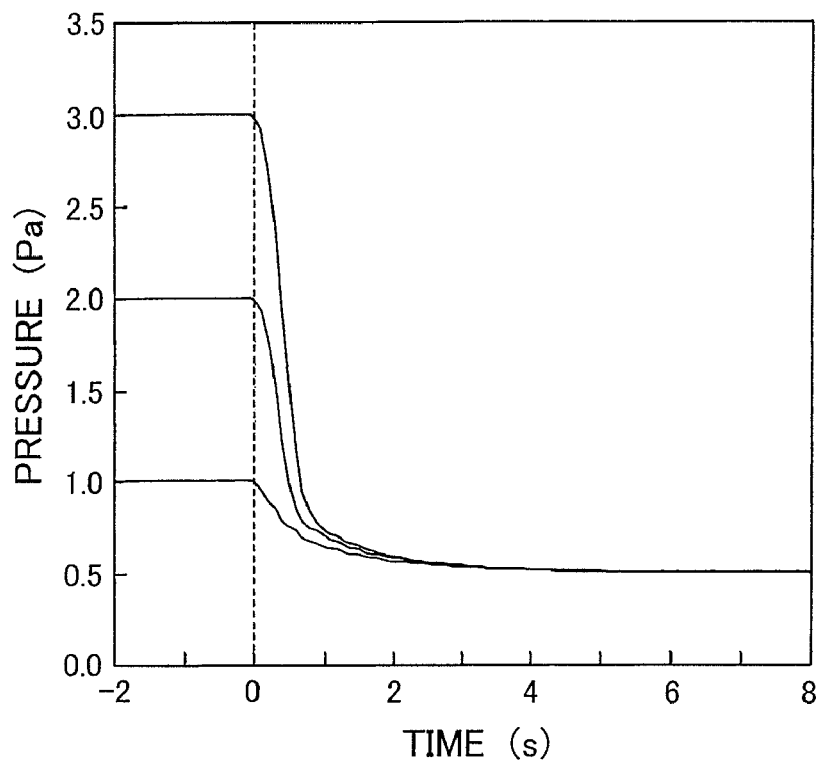
FIG. 21 is a graph showing pressure response in the control method of Comparative Example 2.
FIG. 22 is a table of constants which are used in Comparative Example 3.

Using the same constants, a test was conducted to investigate the pressure response in decreasing the target pressure from 1.0, 2.0 and 3.0 Pa to 0.5 Pa. FIG. 21 shows the test result. It is known from this that it takes longer time to reach 0.5 Pa target pressure than in the case shown in FIG. 8 where constants b2 and c2 are not 0.

This suggests that quick control is possible in the first embodiment even under different pressure conditions because integral gain Gi and proportional gain Gp have a negative correlation with target pressure P0. Although the values of integral gain Gi and proportional gain Gp are given by Formulas 2 and 3 respectively in the first embodiment, as far as integral gain Gi and proportional gain Gp are functions which have a negative correlation with target pressure P0, they may be given in another way to achieve a similar effect.

COMPARATIVE EXAMPLE 3

Another feature of the first embodiment is that integral gain Gi is a function which has a positive correlation with exhaust speed Sn in Formula 2. The advantage of this feature is discussed below.

First, in order to eliminate the correlation between integral gain Gi and exhaust speed Sn, a pressure control performance test was carried out where a2 in Formula 2 was 0.

Figure 23:
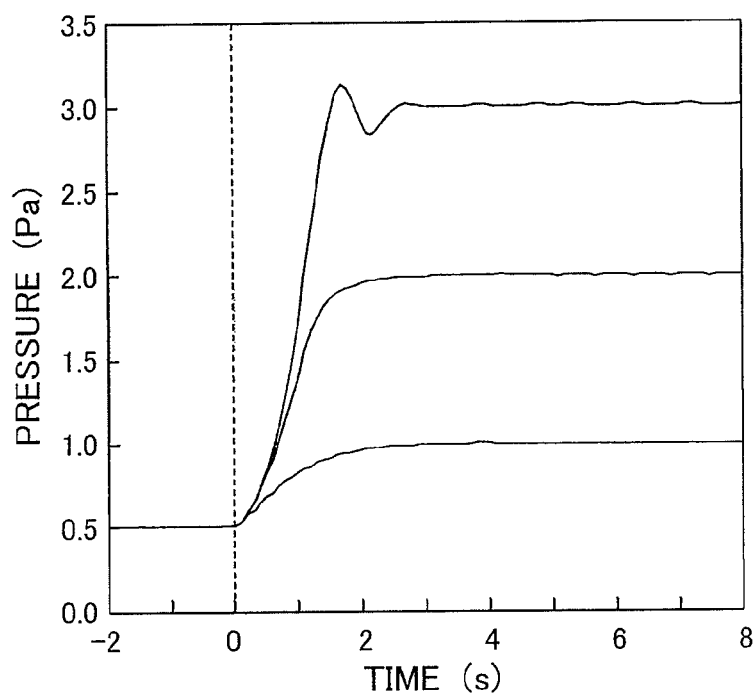
FIG. 23 is a graph showing pressure response in the control method of Comparative Example 3.
Figure 24:
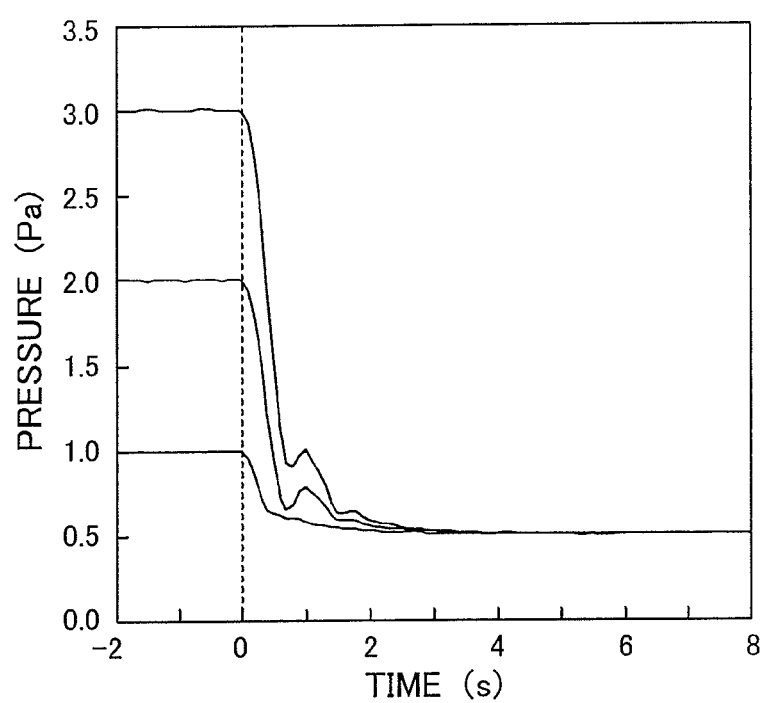
FIG. 24 is a graph showing pressure response in the control method of Comparative Example 3.

In the test, $O_2$ gas as processing gas was supplied at a flow rate of 150 sccm and the target pressure was increased from 0.5 Pa to 1.0, 2.0 and 3.0 Pa in the absence of plasma discharge and pressure response was investigated. For constants other than a2, namely "an", "bn", and "cn", the values optimized for target pressure increase from 0.5 Pa to 2.0 Pa as shown in FIG. 22 were used. FIG. 23 shows the test result. Under the optimized condition for 2.0 Pa, the pressure rises almost as quickly as in the case shown in FIG. 6 where a2 is not 0. On the other hand, under the non-optimized condition for 1.0 Pa target pressure, the pressure does not rise quickly. Also using the same constants, a test was conducted to investigate the pressure response in decreasing the target pressure from 1.0, 2.0 and 3.0 Pa to 0.5 Pa. FIG. 24 shows the test result. It is known from this that it takes longer time to reach 0.5 Pa target pressure than in the case shown in FIG. 8 where a2 is not 0.

This suggests that quick control is possible in the first embodiment even under different pressure conditions because integral gain Gi has a positive correlation with exhaust speed Sn.

Figures 25, 26:
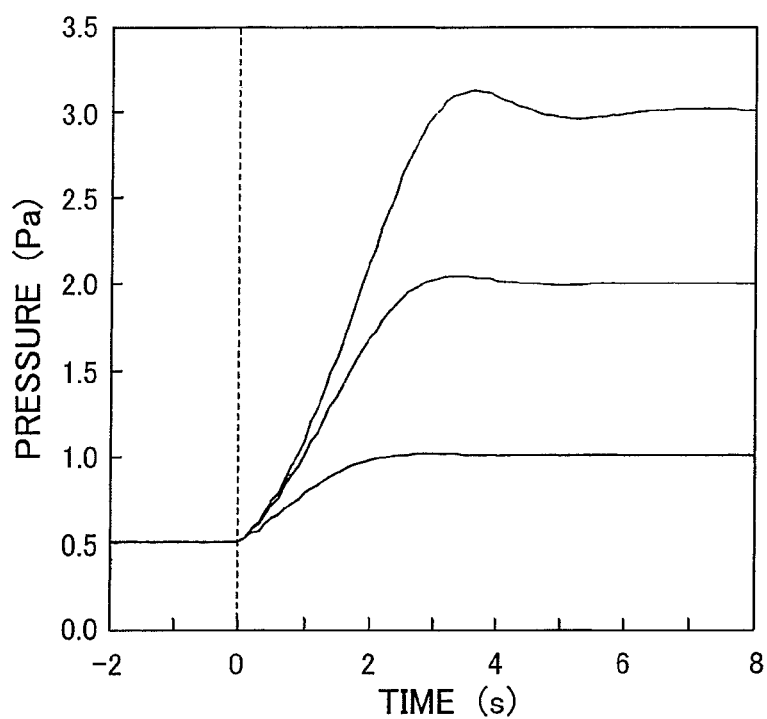
FIG. 25 is a table of constants which are used in a second embodiment.
FIG. 26 is a graph showing pressure response in the control method according to the second embodiment.

Although the value of integral gain Gi is given by Formula 2 in the first embodiment, as far as integral gain Gi is a function which has a positive correlation with exhaust speed Sn, any other function may be used to achieve a similar effect. In the test, the values optimized for pressure increase from 0.5 Pa to 2.0 Pa as shown in FIG. 25 were used for constants "an", "bn", and "cn".

Second Embodiment

A pressure control test was conducted on the pressure control device shown in FIG. 1 in which the length of the pipe 12 connecting the processing chamber and the pressure gauge was increased from 5 mm to 1 mm. As a result of the increase in the length of the pipe 12, time lag in transmission of the actual pressure in the processing chamber to the pressure gauge increased from 25 ms to 500 ms.

In the test, $O_2$ gas as processing gas was supplied at a flow rate of 150 sccm and the target pressure was increased from 0.5 Pa to 1.0, 2.0 and 3.0 Pa in the absence of plasma discharge and pressure response was investigated. Formulas 2 and 3 were used for integral gain Gi and proportional gain Gp, and the values optimized for target pressure increase from 0.5 pa to 2.0 Pa as shown in FIG. 25 were used for constants "an", "bn", and "cn".

FIG. 26 shows the test result. The time required for control increased from 1-2 seconds (in the first embodiment) to 4-6 seconds. This is because of a lag between the reading of the pressure gauge and the actual pressure in the processing chamber by increasing the length of the pipe 12.

Figures 27, 28:
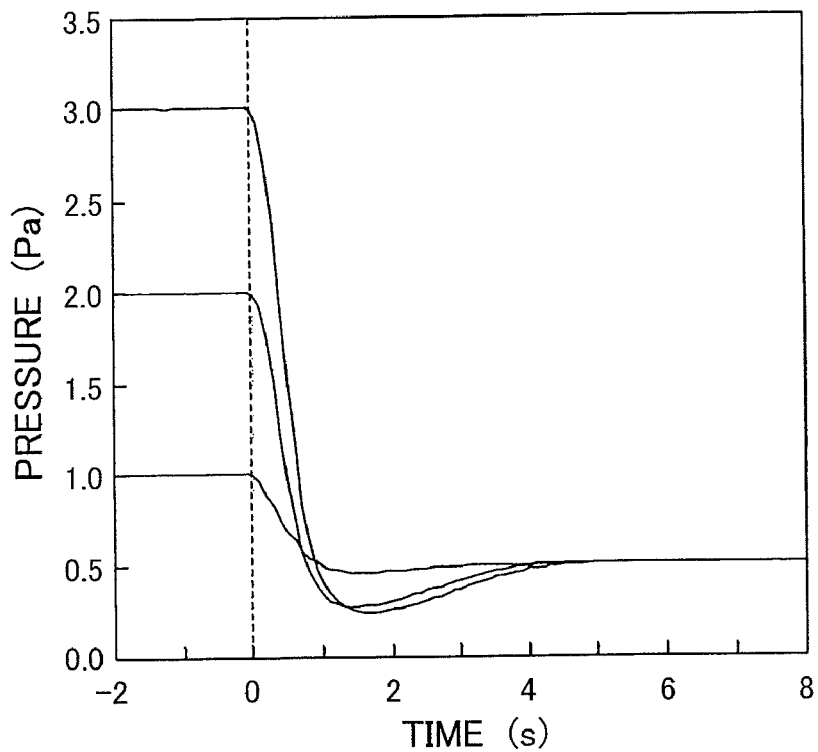
FIG. 27 is a graph showing pressure response in the control method according to the second embodiment.
FIG. 28 is a table of constants (revised) which are used in the second embodiment.

An attempt to further improve response in this situation would result in a further overshoot. Using the constants shown in FIG. 25, a test was conducted on the pressure response in decreasing the target pressure from 1.0, 2.0 and 3.0 Pa to 0.5 Pa. As shown in FIG. 27, response is relatively good in decrease from 1.0 Pa but an extreme undershoot occurs in decrease from 2.0 Pa or 3.0 Pa.

In order to solve this problem, the inventors have developed Formulas 6 and 7 in which pressure value Pn for each control cycle is added to the denominators of Formulas 2 and 3 which respectively express integral gain Gi and proportional gain Gp in the present invention.

[Formula 6]

$$G_i = \frac{a_1 + a_2 S_n}{b_1 + b_2 P_0 + b_3 P_n} \quad (6)$$

[Formula 7]

$$G_p = \frac{1}{c_1 + c_2 P_0 + c_3 P_n} \quad (7)$$

Here, a3, b3, c3: positive constants (fixed values)

Figure 29:
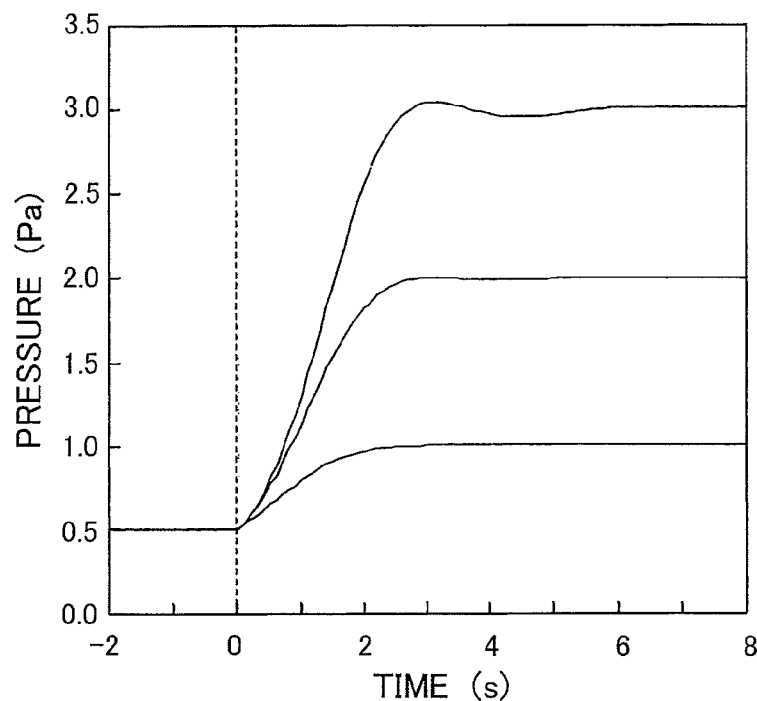
FIG. 29 is a graph showing pressure response (revised) in the control method according to the second embodiment.

In the test, Formulas 6 and 7 were used to express integral gain Gi and proportional gain Gp respectively and $O_2$ gas as processing gas was supplied at a flow rate of 150 sccm and the target pressure was increased from 0.5 Pa to 1.0, 2.0 and 3.0 Pa in the absence of plasma discharge and pressure response was investigated. The values optimized for target pressure increase from 0.5 Pa to 2.0 Pa as shown in FIG. 28 were used for constants "an", "bn", and "cn". FIG. 29 shows the test result. The time required to reach the target pressure decreased about 1 second.

Figure 30:
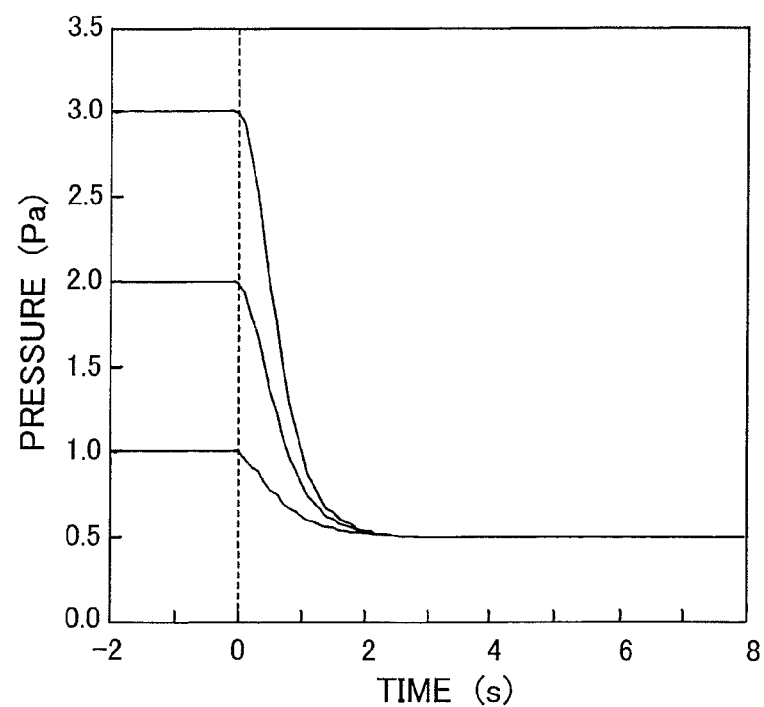
FIG. 30 is a graph showing pressure response (revised) in the control method according to the second embodiment.

Using the constants shown in FIG. 28, a test was conducted on the pressure response in decreasing the target pressure from 1.0, 2.0 and 3.0 Pa to 0.5 Pa. FIG. 30 shows the test result. Here, an undershoot like the one shown in FIG. 27 is not seen and target pressure 0.5 Pa is reached in 2-3 seconds.

This suggests that robustness against time lags is improved by using Formulas 6 and 7, in which pressure value Pn for each control cycle is added to the denominators of Formulas 2 and 3, in the calculation of integral gain Gi and proportional gain Gp.

Although the values of integral gain Gi and proportional gain Gp were given by Formulas 6 and 7 respectively in this embodiment, as far as integral gain Gi and proportional gain Gp are functions which have a negative correlation with both target pressure P0 and pressure value Pn for each control cycle, they may be given in another way to achieve a similar effect.

Third Embodiment

Using the pressure control device shown in FIG. 1, three steps whose conditions are shown in FIG. 31 were carried out to etch a sample whose structure is shown in FIG. 32A. In this etching process, polysilicon 61, silicon oxide film 62, and polysilicon 63 are etched along a resist pattern mask 60, and silicon oxide film 64 is left on silicon 65 as the substrate.

At the first step, the polysilicon 61 and the silicon oxide film 62 are etched. At the second step, the polysilicon 63 is etched until the silicon oxide film 64 is exposed. At this time, the polysilicon 63 is tapered by etching as illustrated in FIG. 32B. At the third step, the tapered portion (pattern bottom) is removed by etching. During this etching work, a high pressure gas condition which slows down the silicon oxide film etching speed is used in order to prevent the silicon oxide film 64 from being etched.

By taking these three steps, the sample is expected to become a rectangular shape of the polysilicon from which said tapered portion is removed, as illustrated in FIG. 32C. In this embodiment, for the purpose of throughput improvement, the three steps are carried out continuously without a waiting time between steps.

Regarding how a sample having the structure as shown in FIG. 32A is shaped by processing, comparison was made between the pressure control method according to the present invention and the conventional pressure control method.

Figure 33:
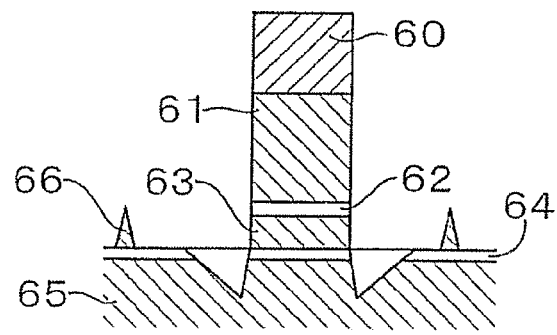
FIG. 33 illustrates the structure of an etched sample.

When the control method according to the present invention was used, the silicon oxide film 64 remained almost intact across its thickness as illustrated in FIG. 32C. On the other hand, when the conventional control method was used, part of the silicon oxide film 64 at the pattern bottom was lost and the substrate silicon 65 was partially etched as shown in FIG. 33. In addition, a residue 66 was seen on the silicon oxide surface.

Figure 34:
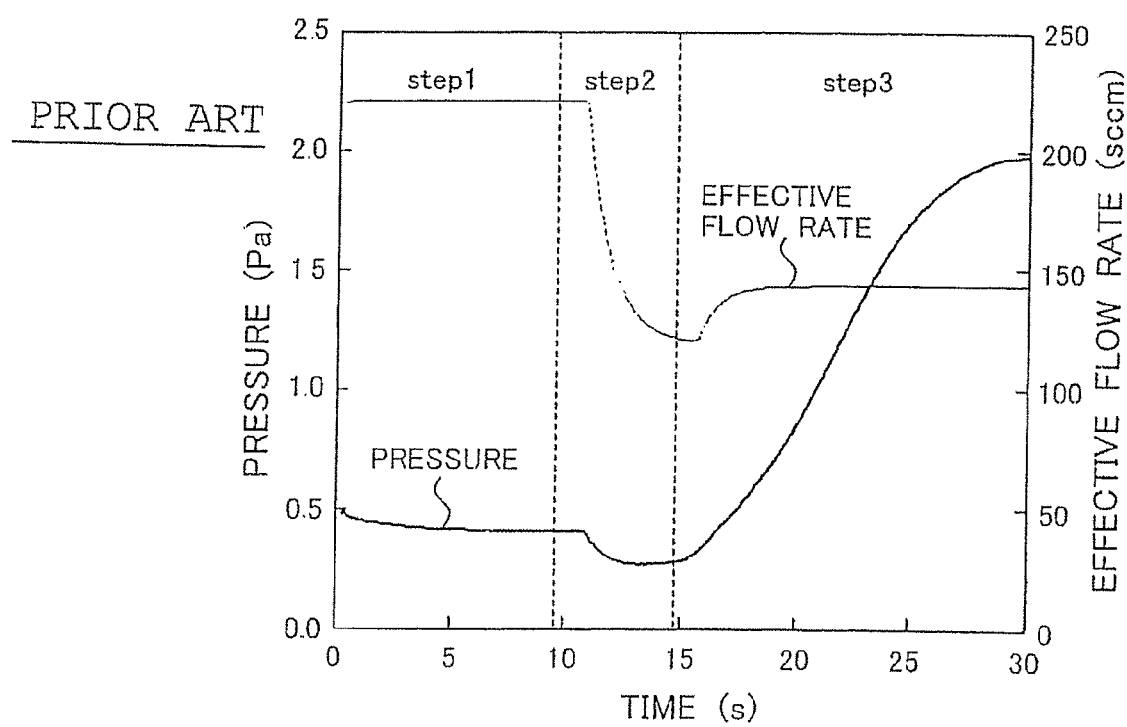
FIG. 34 is a graph showing changes in effective gas flow rate and pressure in the conventional control method.

Next, the reason for the partial loss of the silicon oxide film 64 at the pattern bottom was investigated. FIG. 34 shows how the effective gas flow rate and the pressure change when the conventional method is used.

As indicated in FIG. 34, in the conventional control method, the speed of pressure rise after the start of Step 3 was slow and while the pressure was below 2 Pa, the wafer (sample) was processed.

Figure 35:
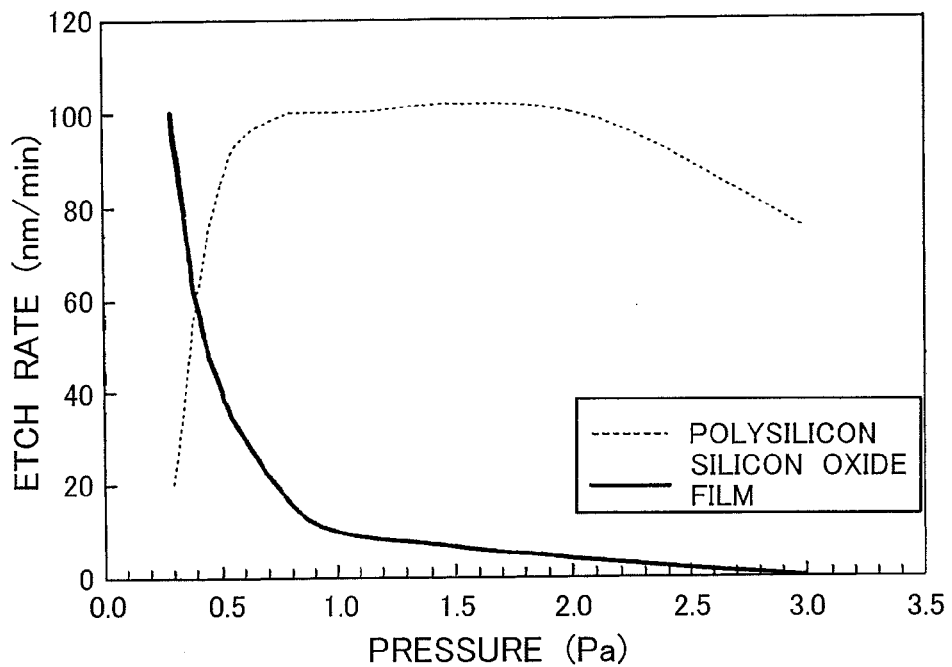
FIG. 35 is a graph showing etch rates for polysilicon and silicon oxide film which vary with pressure.

FIG. 35 shows etch rates for the polysilicon and silicon oxide film in pressure change from 0.4 Pa to 2 pa under the gas condition for Step 3. It is apparent from FIG. 35 that while the silicon oxide film etch rate is very low at 2 Pa, it is higher at lower pressure levels, or as high as 40 nm/min or so around 0.5 Pa, suggesting a very low etch selectivity of the silicon to silicon oxide.

Therefore, it may be considered that the silicon oxide film 64 was thin and part of the silicon oxide film 64 was etched in the period from the start of Step 3 until 2 Pa was reached.

Besides, at Step 2, the sudden decline in the flow rate could not be followed up by pressure control and the pressure remained as low as 0.3 Pa or less. Since the polysilicon etch rate was as low as 60 nm/min or less in the low pressure range below 0.3 Pa, etching of the polysilicon hardly progressed. It may be considered that polysilicon residue 66 was generated for this reason.

Figure 36:
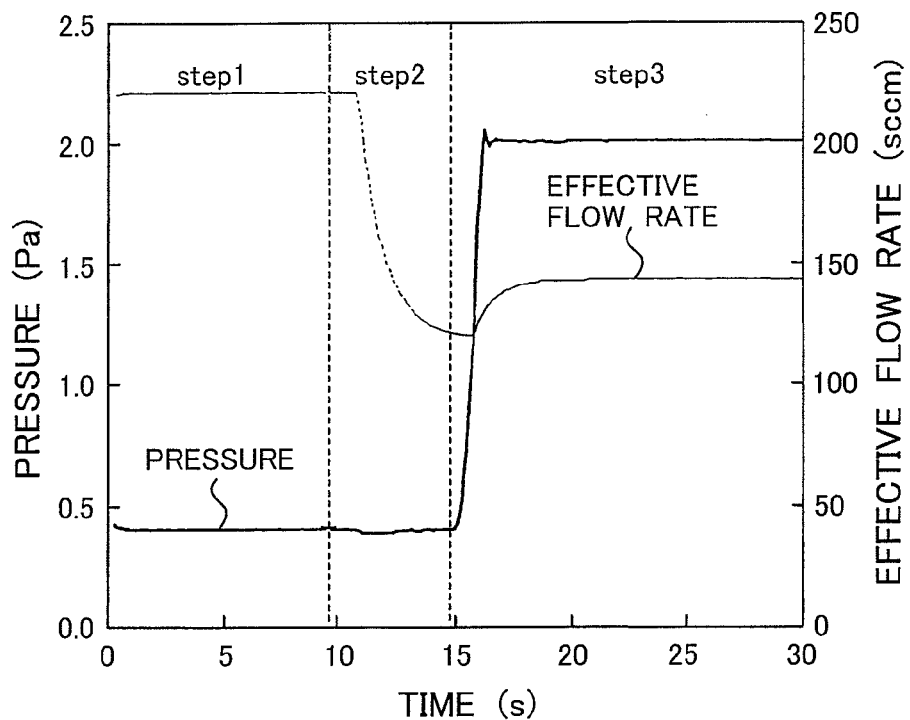
FIG. 36 is a graph showing change in pressure in the control method according to the present invention.

FIG. 36 shows the result of a test on pressure change in the control method according to the present invention. As shown in FIG. 36, the time required to reach 2 Pa after the start of Step 3 is decreased to 1 second. Furthermore, virtually no pressure drop is seen just after the start of Step 2. It may be considered that for these reasons the processed sample has a good shape as shown in FIG. 32C.

Consequently in the control method according to the present invention, even if the steps are continuously carried out, etching can be properly done and throughput can be improved.

As explained so far, according to the preferred embodiments of the present invention, an exhaust speed which makes the pressure in the processing chamber equal to the target pressure is calculated by PID control calculation; and feedback control of exhaust speed adjusting means (throttle valve) is performed to match the valve opening degree to the calculated exhaust speed. In the PID control calculation, the integral gain and proportional gain have a negative correlation with the target pressure value and the integral gain has a positive correlation with exhaust speed. Hence, irrespective of the throttle valve's exhaust characteristics (nonlinear relation between exhaust speed and valve opening), the pressure in the processing chamber can be quickly brought to the desired pressure level. Even when gas type, gas flow rate or target pressure is altered, optimization of the gains is not needed. Therefore, quick, flexible pressure control can be performed.

What is claimed is:

1. A pressure control device for a plasma processing apparatus comprising:
   gas supply means which supplies processing gas to a low pressure processing chamber;
   plasma generating means which supplies electromagnetic energy to the processing gas supplied to the low pressure processing chamber, and which generates plasma;
   exhaust means which exhausts gas in the low pressure processing chamber;
   pressure measuring means which measures gas pressure in the low pressure processing chamber;
   exhaust speed adjusting means which adjusts an exhaust speed of gas to be exhausted by said exhaust means; and
   an arithmetic and control unit which performs a Proportional-Integral-Derivative (PID) control calculation to calculate an operation amount of an exhaust speed of gas so as to make the gas pressure measured by said pressure measuring means equal to a target pressure, and which controls said exhaust speed adjusting means to adjust an opening of an exhaust valve so as to make a change of the exhaust speed equal to said operation amount of the exhaust speed,
   wherein said PID control calculation is made for each control cycle based on the exhaust speed of gas and the target pressure, and an integral gain in said PID control calculation is a function which has a positive correlation with the exhaust speed of gas and a negative correlation with the target pressure.

2. The pressure control device according to claim 1, wherein a proportional gain in said PID control calculation is a function which has a negative correlation with the target pressure.

3. A method of controlling a pressure in a processing chamber having a gas inlet arranged to inlet gas into the chamber, an exhaust valve arranged to exhaust gas from the chamber, and a pressure gauge arranged to measure a gas pressure in the chamber, the method comprising:
   supplying gas to the chamber, via the gas inlet;
   exhausting gas from the chamber, via the exhaust valve;
   measuring the gas pressure in the chamber, via the pressure gauge; and
   automatically adjusting the gas pressure in the chamber to a target pressure, using a Proportional-Integral-Derivative (PID) control, based on an exhaust speed of gas leaving the chamber, via the exhaust valve, and the gas pressure from the pressure measured, via the pressure gauge,
   wherein the PID control is calculated for each control cycle to adjust an opening of the exhaust valve corresponding to a change in the exhaust speed, using gain values obtained for each control cycle based on the exhaust speed of gas and the target pressure, and
   wherein the gain values used in said PID control include an integral gain that has a positive correlation with the exhaust speed of gas calculated with the opening of the exhaust valve in each control cycle and a negative correlation with the target pressure and varies from one control cycle to another control cycle, a proportional gain that has a negative correlation with the target pressure and varies from one control cycle to another control cycle, and a differential gain that is a fixed constant.

4. The method according to claim 3, wherein the integral gain and the proportional gain are used to adjust the valve opening so as to attain an operation amount of the exhaust speed of gas and to adjust the gas pressure to the target pressure.

5. The method according to claim 3,
wherein the integral gain (Gi) is calculated in accordance with the following formula:

$$G_i = \frac{a_1 + a_2 S n}{b_1 + b_2 P_0} \quad (2)$$

wherein the proportional gain (Gp) is calculated in accordance with the following formula:

$$G_p = \frac{1}{c_1 + c_2 P_0} \quad (3)$$

where a1, b1, c1 represent zero (0) or a fixed positive constant; a2, b2 and c2 represent a fixed positive constant; Sn represents a current exhaust speed; and $P_0$ represents a target pressure.

6. The method according to claim 5,
wherein the change in the exhaust speed (ΔS) is calculated in accordance with the following formula:

$$\Delta S = \quad (4)$$
$$S_{n+1} - S_n = G_i(P_n - P_0) + G_p(P_n - P_{n-1}) + G_d(P_n - 2P_{n-1} + P_{n-2})$$

wherein the opening of the exhaust speed (ΔVV) is calculated in accordance with the following formula:

$$\Delta VV = F(S_{n+1}) - VV_n \quad (5)$$

where VVn is a current valve opening (%); Sn+1 is the next exhaust speed (L/s); Sn is the current exhaust speed (L/s); Pn is the current pressure (Pa); Pn−1 is the previous pressure (Pa); Pn−2 is the pressure before the previous pressure; P0 is the target pressure (Pa); Gi is an integral gain (varies from one control cycle to another); Gp is a proportional gain (varies from one control cycle to another); Gd is a differential gain (constant); and F(s) is a function of exhaust speed and valve opening as measured using standard gas in advance.

* * * * *